United States Patent [19]
Alcone

[11] Patent Number: 5,396,414
[45] Date of Patent: Mar. 7, 1995

[54] ADAPTIVE NOISE CANCELLATION

[75] Inventor: Jerry M. Alcone, Albuquerque, N. Mex.

[73] Assignee: Hughes Aircraft Company, Los Angeles, Calif.

[21] Appl. No.: 951,501

[22] Filed: Sep. 25, 1992

[51] Int. Cl.$^6$ .................... G06F 15/46; G05B 13/02
[52] U.S. Cl. .................... 364/148; 364/572; 364/574; 364/724.19
[58] Field of Search ............ 364/150, 148, 151, 508, 364/572, 574, 724.01, 724.19, 152; 381/71, 73.1; 181/206

[56] References Cited

U.S. PATENT DOCUMENTS

| | | |
|---|---|---|
| 3,932,818 | 1/1976 | Masak . |
| 3,961,234 | 6/1976 | Chambers et al. . |
| 4,177,430 | 12/1979 | Paul . |
| 4,238,746 | 12/1980 | McCool et al. . |
| 4,473,906 | 9/1984 | Warnaka et al. . |
| 4,524,424 | 6/1985 | White . |
| 4,589,137 | 5/1986 | Miller . |
| 4,649,505 | 3/1987 | Ziegler, Jr. et al. ............... 379/411 |
| 4,658,426 | 4/1987 | Chabries et al. . |
| 4,730,343 | 3/1988 | Kanemasa et al. . |
| 4,878,188 | 10/1989 | Ziegler, Jr. .................... 364/724.01 |
| 5,008,937 | 4/1991 | Yamamura et al. ................. 380/50 |
| 5,029,118 | 7/1991 | Nakajima et al. .................. 364/572 |
| 5,105,377 | 4/1992 | Ziegler, Jr. .................... 364/724.01 |
| 5,157,596 | 10/1992 | Alcone .......................... 364/148 |
| 5,272,663 | 12/1993 | Jones et al. ....................... 364/825 |

OTHER PUBLICATIONS

"Adaptive Noise Cancelling: Principles and Applications" B. Widrow et al., Proceedings of the IEEE, vol. 63, No. 12, Dec. 1975.

"Transform Domain LMS Algorithm" S. Shankar Narayan et al., IEEE Transactions on Acoustics Speech and Signal Processing, vol. ASSP-31, No. 3, Jun. 1983.

Primary Examiner—Roy N. Envall, Jr.
Assistant Examiner—Cameron H. Tousi
Attorney, Agent, or Firm—Hugh P. Gortler; M. W. Sales; W. K. Denson-Low

[57] ABSTRACT

A compensator that enables an adaptive filter to be placed within a closed loop control system so as to reduce the effects of both measurable and unmeasurable disturbances on the output of the control loop. The disturbances may have spectra that lie within or outside the bandwidth of the control loop. The effectiveness of the reduction is dependent upon the capabilities of the loop actuator and/or the control electronics. The reduction is not limited only to the bandwidth of the control loop, as in conventional disturbance rejection, and is equally effective against feedback path disturbances which are unreduced in conventional approaches. A further aspect of the invention relates to a reduction of an intrinsic noise floor associated with control systems, including open loop and closed loop control systems, that does not require an independent noise measurement to be made. Also, an adaptive controller is taught that places an adaptive filter in parallel with a control loop to provide a unity response control system that is insensitive to measurable disturbances and which furthermore has an improved control performance relative to a conventional control loop.

11 Claims, 6 Drawing Sheets

FIG. 1a.

( PRIOR ART )

$$V = \frac{G_p G_a G_c \, n + d}{1 + G_p G_c G_a H}$$

OPEN LOOP TF = $f/e$ = $G_p G_a G_c H$

FIG. 1b.

( PRIOR ART )

ADAPTIVE NOISE CANCELLATION

FIELD OF THE INVENTION

This invention relates generally to closed loop control systems and, in particular, to methods and apparatus for extending the disturbance and noise rejection bandwidths of a closed loop control system, for decreasing the noise floor of the loop, and for adaptively compensating a control loop so that it behaves as a unity response control system.

BACKGROUND OF THE INVENTION

A unity response control system is a system whose closed loop response has unity gain at frequencies below the closed loop bandwidth of the loop. The closed loop bandwidth is defined as the frequency at which the loop gain first drops to −3 db.

The performance of conventional control loops is limited by (a) a loss of forward path disturbance and noise rejection at frequencies above the closed loop bandwidth of the system, and (b) by a lack of rejection of feedback path disturbances below this frequency. Conventional control loops are also limited in bandwidth as a result of an inability to readily compensate for undesirable dynamics in the control loop. For the purposes of this invention disturbances are considered to be external inputs to a system that may or may not be measurable. Noises are considered to be unmeasurable, internally generated signals.

Prior adaptive control concepts, such as that described in "Nonlinear Automatic Control" by John E. Gibson, MacGraw Hill Book Company (1963) are limited by external, forward path or feedback disturbances that degrade plant identification or model reference calculations. In prior model reference adaptive control approaches the adaptive controller converges to a best fit of the plant dynamics and the disturbance, or alternatively, it converges to a best fit of their inverses. This often results in a desired behavior not being obtained, or the system exhibiting unstable behavior.

Conventional control loop bandwidth extension is limited by a requirement to tailor both a phase and a gain of a control compensation device and the fact that conventional compensation filters do not allow independent adjustment of their phase and gain characteristics. However, an adaptive filter can exhibit approximately independent phase and gain characteristics. Thus, an adaptive filter can be used to compensate a closed loop so as to achieve a bandwidth unachievable by conventional means.

By example, for a control system having a resonance located at or just above a desired closed loop cross-over frequency, a conventional notch filter cannot be used, while Adaptive Noise Cancellation (ANC) is well suited for compensating the system. Such is described, for the open loop case, in an article entitled "Adaptive Noise Cancelling: Principles and Applications" Proceedings of the IEEE, Vol. 63, No. 12, December 1975, by B. Widrow et al. It should be noted that an adaptive notch as described in this article will, in many cases, cause a closed loop control system to be unstable unless compensation techniques are employed as taught in commonly assigned U.S. patent application Ser. No. 07/075,013, filed Jul. 17, 1987, entitled "Adaptive Noise Cancellation in a Closed Loop Control System" by J. M. Alcone.

Also by example, control loop noise floor reduction by conventional filtering techniques is limited by the phase restrictions inherent in closed loop systems. Such noise is particularly troublesome when the noise spectrum lies within the bandwidth of the loop. Conventional ANC practice for open loop applications requires a measure of the noise to serve as a reference. However, such a measure is usually unavailable when dealing with a noise floor problem in a closed loop system, since the noise is generated within the components of the loop and is not independently measurable.

Figure 1A:
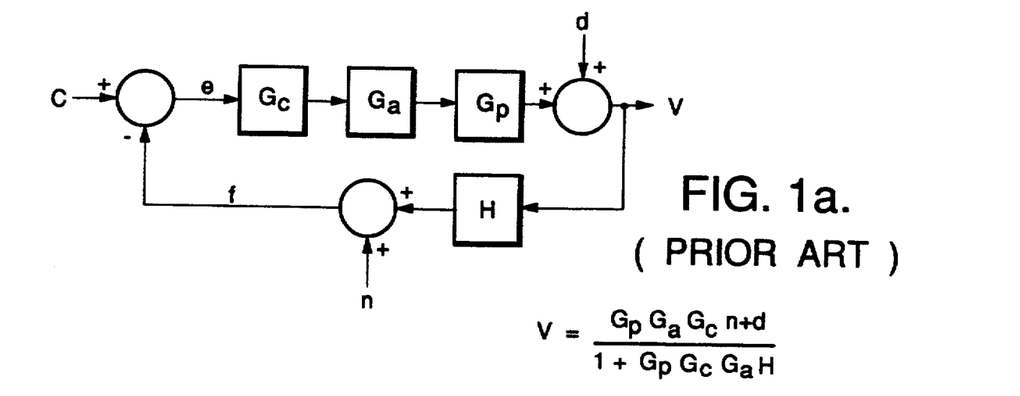
FIG. 1a shows a conventional control system of the prior art having measurable forward and feedback path disturbances.
Figure 1B:
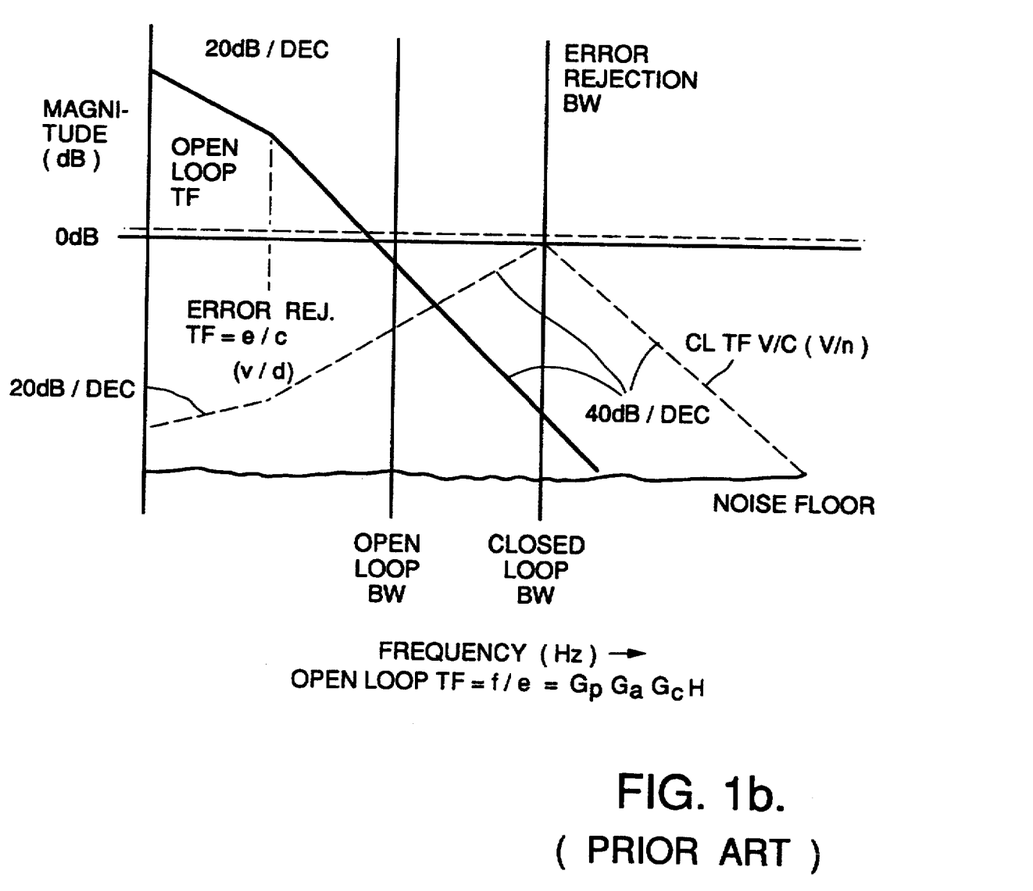

FIG. 1a shows a conventional control system of the prior art having measurable forward and feedback path disturbances, d and n, respectively. FIG. 1b is a graph illustrating the asymptotic disturbance rejection characteristics of the conventional control loop of FIG. 1a. In FIG. 1b it is assumed that the control system is a TYPE 1, first order plant. For simplicity the disturbance (r/d) or error rejection (e/c) and closed loop bandwidths are shown as being identical. It should be noted that the forward path disturbance (d) is attenuated at frequencies below the error rejection or closed loop bandwidth (BW) while the feedback path disturbance (n) is attenuated at frequencies above the error rejection BW. The open loop (OL) and closed loop (CL) transfer functions (TF) are as shown. Also shown is the loop noise floor which, for the purposes of this invention, is considered to be the quiescent state loop noise which is essentially flat and extends across the entire spectrum. An ideal control loop is considered to be one having a unity gain transfer function between an external input and the loop output.

In the aforementioned journal article entitled "Adaptive Noise Cancelling: Principles and Applications" Proceedings of the IEEE, Vol. 63, No. 12, December 1975, by B. Widrow et al. there is described the concept of adaptive noise cancelling, the concept being developed in the context of an open loop system. The disclosed technique employs a primary input containing a corrupted signal and a reference input containing noise correlated in some unknown way with the primary noise. The reference input is adaptively filtered and subtracted from the primary input to obtain a less corrupted signal.

In a journal article entitled "Transform Domain LMS Algorithm" IEEE Transactions on Acoustics, Speech, and Signal Processing, Vol. ASSP-31, No. 3, June 1983, S. by S. S. Narayan et al. transform domain adaptive filtering is described. Narayan et al. employ comb filters to separate, or orthogonalize, inputs to an adaptive filter weight calculation to improve adaptive filter performance for open loop applications.

In U.S. Pat. No. 3,932,818, Jan. 13, 1976 Masak discloses an adaptive filter for suppressing narrow band noise in wide band systems. In U.S. Pat. No. 3,961,234, Jun. 1, 1976 Chambers et al. teach an adaptive filter circuit and an adaptive "dead band" to make the loop less responsive to noise and a control loop error signal. In U.S. Pat. No. 4,238,746, Dec. 9, 1980 McCool et al. disclose an adaptive line enhancer for spectral line enhancing. In U.S. Pat. No. 4,524,424, Jun. 18, 1985, White teaches a matched pair of filters acting on reference and error inputs for enhancing an adaptive filter's ability to detect a signal within a noisy spectrum. In U.S. Pat. No. 4,589,137, May 13, 1986 Miller discloses an adaptive filter and presents only an open loop application. In U.S. Pat. No. 4,568,426, Apr. 14, 1987, Chabries et al. disclose a noise suppression device embodied as a feedback suppression device wherein a projection operator has an output fed back for adjusting filter weights. In U.S. Pat. No. 4,730,343, Mar. 8, 1988 Kanemasa et al. disclose a method for extracting a reference noise signal from an error signal.

In U.S. Pat. No. 4,473,906, Sep. 25, 1984 Warnaka et al. disclose an active acoustic attenuator that operates with a modified version of the LMS algorithm. Closed loop applications are not disclosed and, in addition, Warnaka et al. disclose a requirement that a disturbance include DC and low frequency components, and that the LMS algorithm be modified to reflect the acoustic delays inherent to the system.

It is an object of this invention to provide Adaptive Noise Cancellation methods and apparatus for lowering a noise floor of an open loop or a closed loop control system, for extending the error rejection bandwidth of a closed loop control system for improving the rejection of feedback path disturbances, and for achieving a desired improved control characteristic in a control system that is substantially insensitive to noise and other disturbances.

A further object of the invention is to provide noise floor suppression that does not require a direct measurement of the disturbance, that requires but one adaptive filter, and that is suitable for use with open or closed loop systems having time delays or other dynamics.

It is a further object of the invention to provide method and apparatus for extending a disturbance or noise rejection bandwidth of a closed loop control system, where disturbances or noises can occur in the forward or feedback paths.

A further object of the invention is to provide an adaptive compensation filter in parallel or series with a control loop to provide a unity response control system that is insensitive to measurable, and in some cases unmeasurable, disturbances and noises, and which furthermore has an improved control performance.

SUMMARY OF THE INVENTION

The foregoing problems are overcome and the objects of the invention are realized by methods and apparatus to obtain a disturbance or noise rejection bandwidth extension in a closed loop control system that makes use of available signals from within the control loop, and when available measures of the disturbances, in conjunction with compensation techniques to obtain a desired improvement(s) in rejection. A further aspect of the invention relates to a reduction of an intrinsic noise floor associated with control systems, including open loop and closed loop control systems. The invention teaches the selection of a proper signal from within a closed loop and the introduction of two Adaptive Noise Cancellers (ANC) in such a manner that the noise floor of the loop is lowered. This teaching advantageously does not require an independent noise measure that is normally associated with ANC techniques.

This invention also teaches an adaptive compensator that places an adaptive filter in parallel with a controller to provide a unity response control system that is insensitive to measurable disturbances and which furthermore has an improved control performance relative to a conventional control loop.

The teaching of the invention thus provides a control system that does not respond to measurable disturbances, that exhibits a reduced intrinsic noise floor of a control loop, and that functions as an ideal unity response control system. The measurable and unmeasurable disturbances may be in either the forward or feedback paths of the control loop.

Further in accordance with the invention there is provided a compensator that enables an adaptive filter to be placed within a closed loop control system so as to reduce the effects of both measurable and unmeasurable disturbances on the output of the control loop. The disturbances may have spectra that lie within or without the bandwidth of the control loop. The effectiveness of the reduction is dependent upon the capabilities of the loop actuator and/or the control electronics. The reduction is not limited only to the bandwidth of the control loop, as in conventional disturbance rejection, and is equally effective against feedback path disturbances which are unreduced in conventional approaches.

Advantages made possible by the teaching of the invention include the following. The control loop dynamics may be specified to match ideal desired dynamics. The control loop may be made insensitive to any measurable disturbance or noise. Also, the control loop can reject forward path disturbances up to the bandwidth-amplitude capability (i.e. power) of a system actuator, instead of to a closed loop bandwidth of the system. The control loop may also reject feedback path disturbances up to the bandwidth-amplitude capability of the forward path electronics, in that these disturbances are removed (cancelled) electronically, and not physically as in the forward path case.

BRIEF DESCRIPTION OF THE DRAWING

The above set forth and other features of the invention will be made more apparent in the ensuing Detailed Description of the Invention when read in conjunction with the attached Drawing, wherein:

FIG. 1b is a graph illustrating the asymptotic disturbance rejection characteristics of the conventional control loop of FIG. 1a;

FIG. 2b is a graph showing the response of the control loop of FIG. 2a;

FIG. 3b is a graph showing the response of the control loop of FIG. 3a;

DETAILED DESCRIPTION OF THE INVENTION

Reference is made to a commonly assigned and allowed U.S. patent application Ser. No. 07/075,013, filed Jul. 17, 1987, entitled "Adaptive Noise Cancellation in a Closed Loop Control System" by J. M. Alcone. The disclosure of this allowed U.S. Patent Application is incorporated herein by reference in its entirety.

Figure 2A:
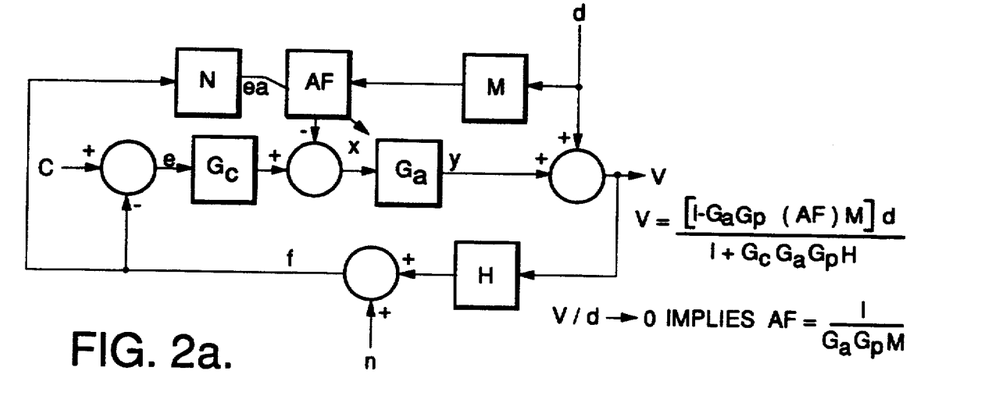
FIG. 2a is a block diagram showing a control loop using ANC configured to have forward path measurable disturbance (d) rejection.
Figure 2B:
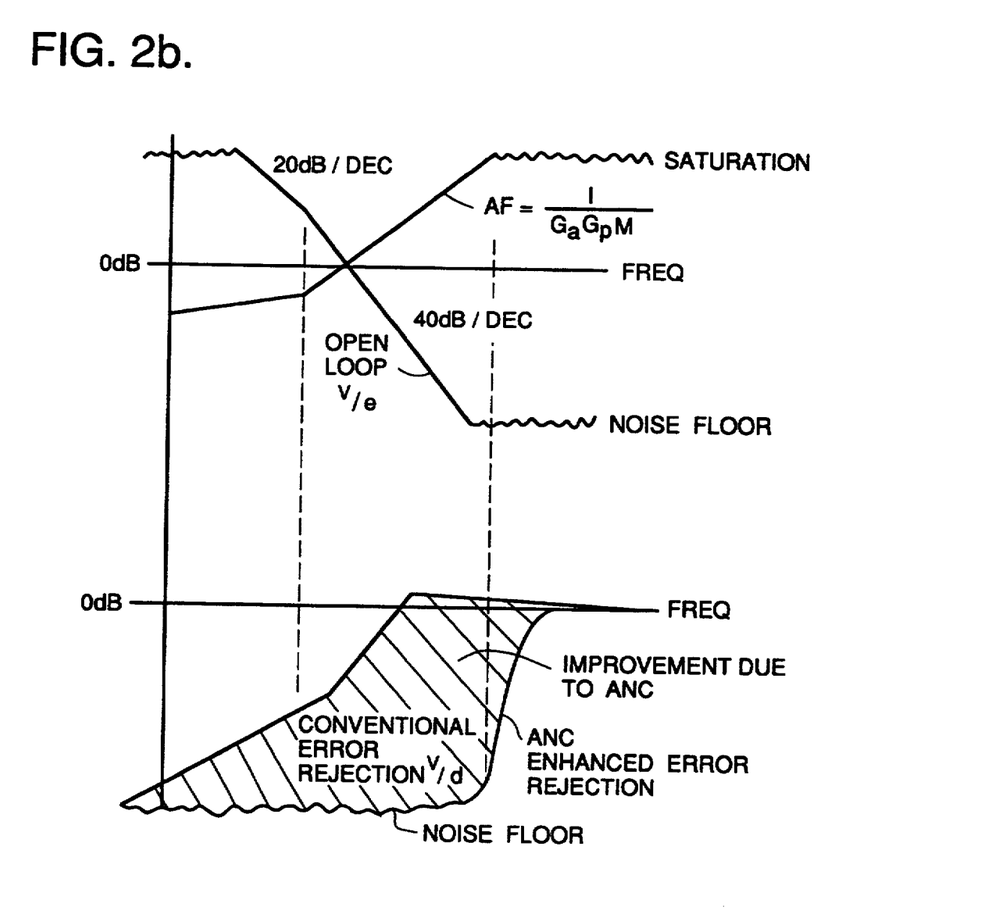
Figure 3A:
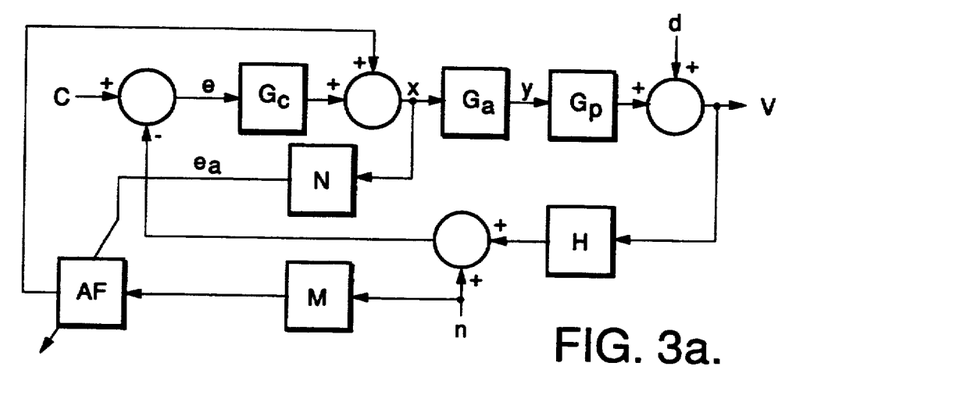
FIG. 3a is a block diagram showing a control loop configured to have feedback path measurable disturbance rejection.
Figure 3B:
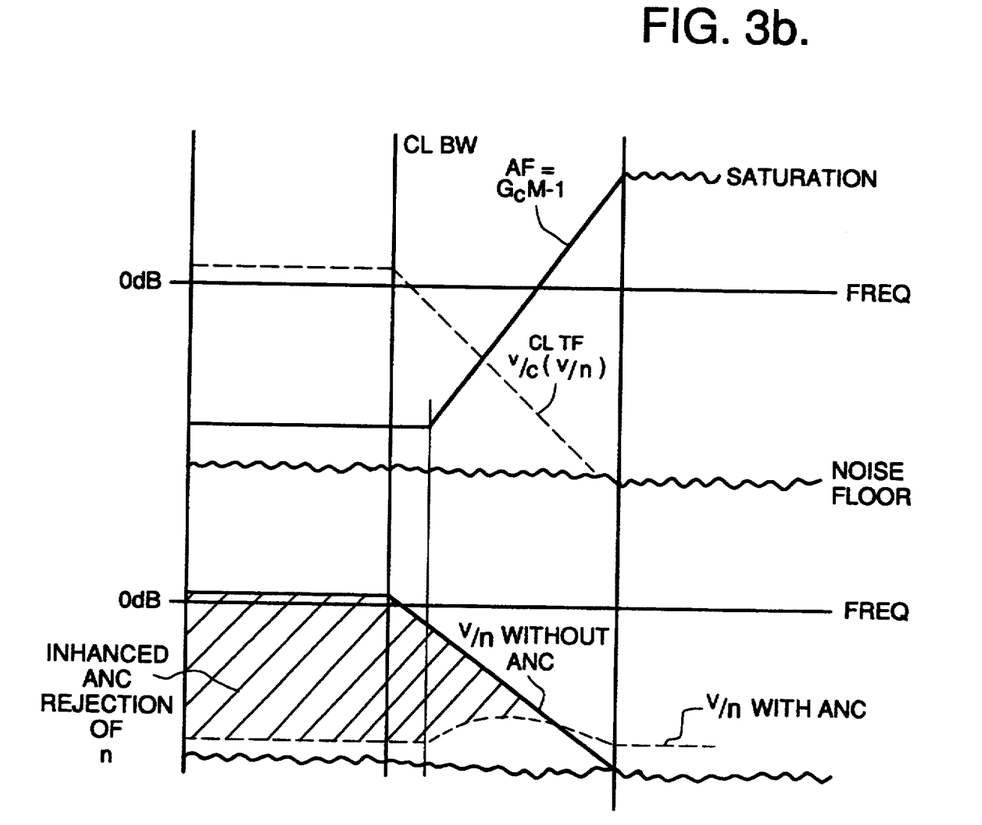

By way of introduction reference is first made to FIGS. 2a and 3a, in conjunction with FIGS. 2b and 3b, respectively. These Figures illustrate the advantage gained by introducing Adaptive Noise Cancellation (ANC) into the closed loop control system shown in FIGS. 1a and 1b. The response of the loop to both forward path disturbances (FIG. 2a) and feedback path disturbances (FIG. 3a) is greatly improved. It can be seen that forward path disturbance rejection calls for action by the actuator ($G_a$) and plant ($G_p$) to physically cancel the disturbance, d. In the feedback path disturbance case of FIG. 3a the cancellation occurs electronically and functions to lighten the actuator load, in that the actuator no longer must respond to the disturbance.

In practice, all of the improvements indicated in FIG. 2b may not be realized. This is because the actuator is also required to provide control action, and the measurement of d, by the Block M, is not noise free. Similar observations apply to FIG. 3b, with electronics substituted for actuator. The small rise in the r/n transfer function, with ANC, is due to amplification of the noises in the system as the ANC gain increases.

For the case of FIGS. 2a and 2b forward path disturbance rejection is improved over that inherent in the control loop, with the improvement being limited by the excess capability of the actuator beyond that required for the control functions of the loop. It should be noted that forward path disturbances must be physically cancelled if the output of the loop (r) is a physical variable.

For the case of FIGS. 3a and 3b feedback path noises, or disturbances, are cancelled at the signal level within the loop. Hence, they are limited by the dynamic range, the noise floor, and the resolution of the signal processing components in the loop, instead of by the actuator.

Thus, the invention enables a disturbance and/or noise rejection bandwidth of an existing control loop to be extended without a corresponding increase in the bandwidth of the control loop and, hence, in the bandwidth of the control loop actuator. Similarly, a system may be designed such that the disturbance rejection bandwidth of a control loop is increased while maintaining a low actuator bandwidth. The teaching of the invention thus enables the control, disturbance, and/or noise rejection characteristics of a control loop to be decoupled one from the other.

Figure 4:
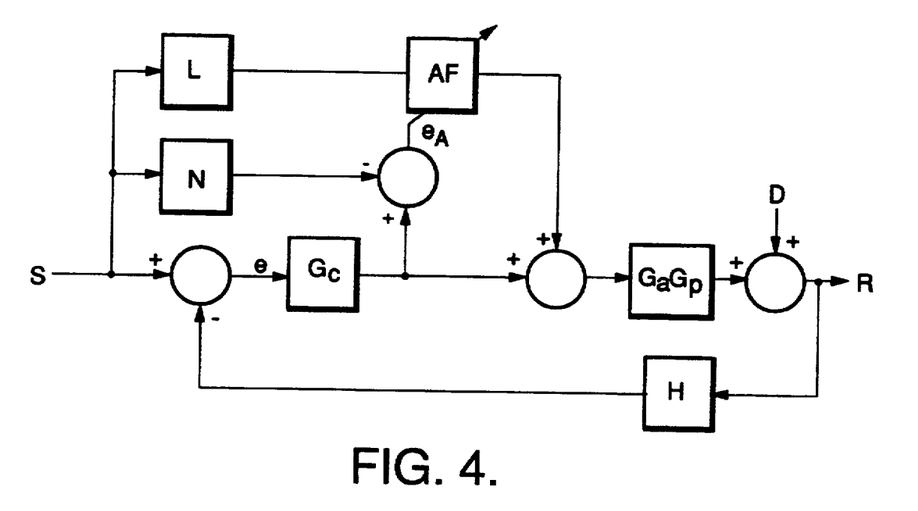
FIG. 4 is a block diagram illustrating ANC employing a loop command signal with an unmeasurable forward path disturbance.
Figure 5:
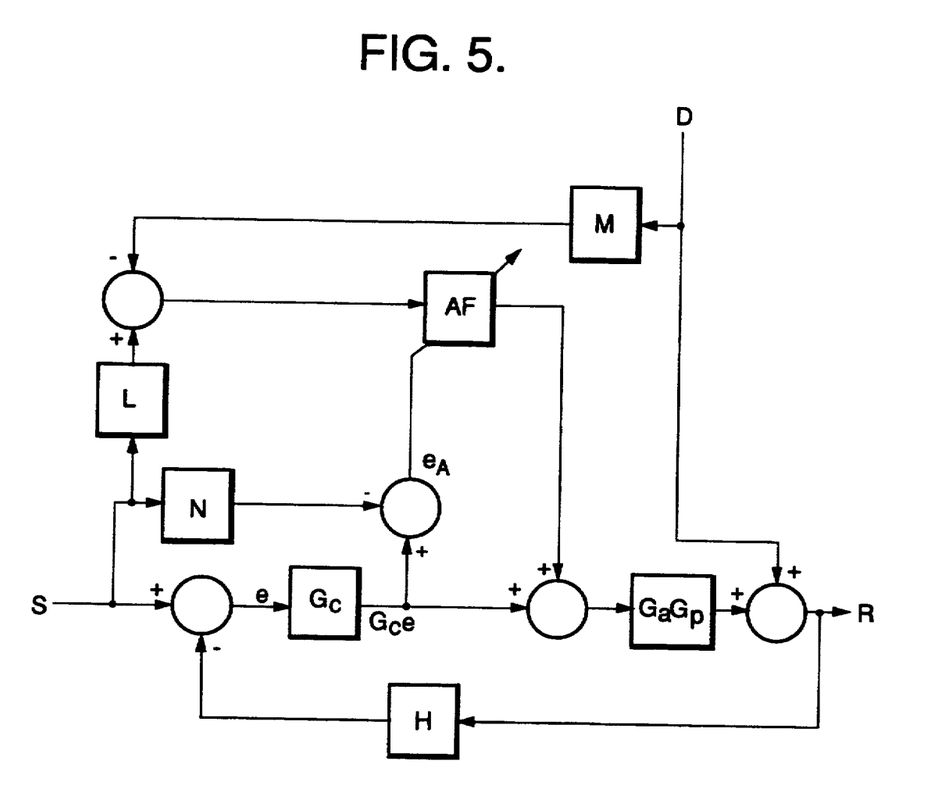
FIG. 5 is a block diagram illustrating ANC employing a loop command signal and a forward disturbance measure.

FIG. 4 is a block diagram illustrating ANC for loop bandwidth extension that employs a loop command signal, while FIG. 5 is a block diagram illustrating ANC for loop bandwidth extension that employs a loop command signal and a disturbance measure. In the Figures "s" represents the loop command signal while "r" represents a loop response signal. The term "d" is representative of a disturbance that typically includes a noise signal which may originate from within the control loop and/or from a source external to the control loop.

The loop bandwidth extender of FIG. 4 employs a compensated measure (Block L) of the loop command signal as a reference input to an Adaptive Filter (AF).

The loop error signal (e), as filtered by block $G_C$, is combined with the loop command, filtered by Block N, and forms the error signal ($e_A$) to the AF. That is, the error signal is taken from the forward path. The AF acts to reduce the error signal $e_A$ by injecting an adaptive compensation signal just after the loop compensator $G_c$. The adaptive compensation signal is summed with the output of block $G_C$ and is applied to the loop actuator ($G_A$) and, hence, to the loop plant ($G_p$) dynamics. This embodiment of the invention increases the loop bandwidth to the point (frequency) at which the compensation blocks L and N become either noise floor or amplitude limited, as shown below.

From FIG. 4, find (for $G = G_C G_A G_P$)

$$R = (G_P G_A (G_C + LAF)S + D)/(1 + GH)$$

and $$e_A = ((i + GH)(G_C - N) - HG_A G_P (G_C + LAF)S - HD)/(1 + GH).$$

Figure 8:
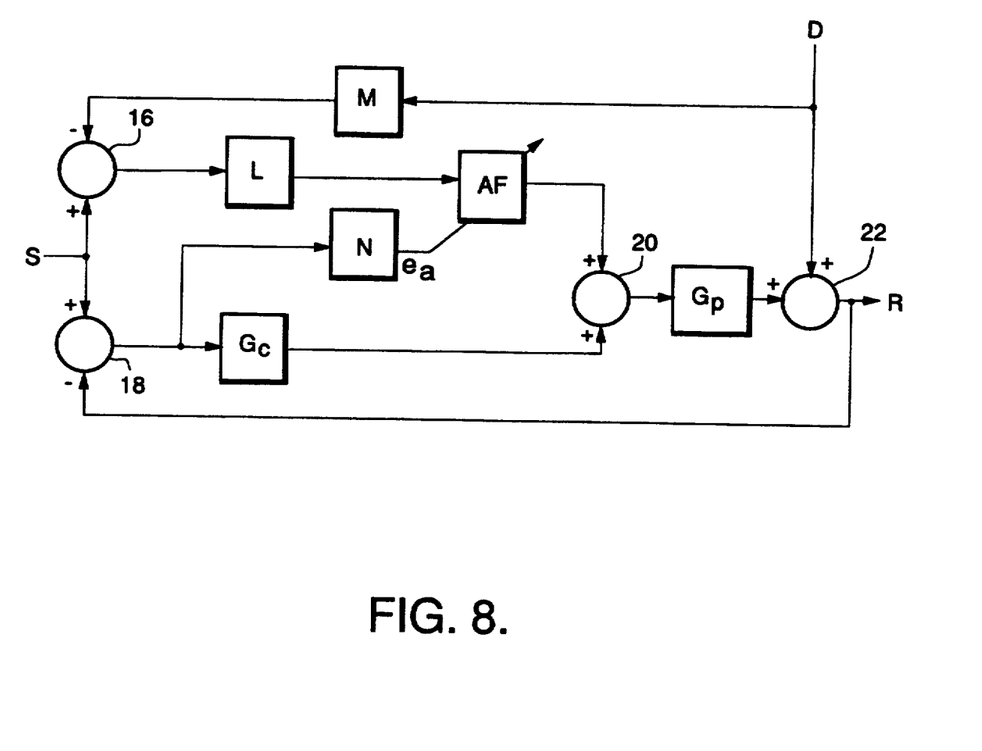
FIG. 8 is a block diagram illustrating an adaptive filter in parallel with a loop dynamic and functioning as an adaptive controller with a measurable forward path disturbance.

Letting $L = (i + GH - G)/(G_A G_P)$, and $N = G_C - H$ results in $e_A = HD/(i + GH)$ and $AF = 1$. Thus, $R = S + (D/1 + G_P G_A G_C H)$. That is, unity gain response with conventional disturbance rejection is achieved. It should be noted that $e_A \neq 0$, but S does not contribute to $e_A$. Also, if the loop error is available, then $N = 1 - H$ can be used. Reference is made to FIG. 8 for showing a further embodiment.

It is also noted that, in practice, $G_P G_A G_C H$ is not known exactly, nor is this term necessarily constant. This implies that the AF takes on the values needed to "match" the assumed form of the compensation block L to the actual dynamics of the system, i.e. in practice $AF \neq 1$.

It should also be noted that D is not addressed here, but is described in reference to FIG. 5 in regard to techniques that reduce the effects of D, a measurable disturbance, on the system.

The blocks N and L represent compensation blocks for compensating the AF for closed loop operation in a manner described in the above referenced commonly assigned U.S. patent application Ser. No. 07/075,013, filed Jul. 17, 1987, entitled "Adaptive Noise Cancellation in a Closed Loop Control System" by J. M. Alcone. For this embodiment of the invention both of the blocks N and L are required. The loop bandwidth extender embodiment of FIG. 5 extends the capability of the FIG. 4 system to provide cancellation of the measurable disturbance D.. Here the block M is used to represent the disturbance sensor and its compensation. The measurement of S, the loop command, is made by the block L. The block N is used to sum S with the compensated loop error, $G_C e$, to produce the error signal ($e_A$) for the AF. In accordance with FIG. 5 there is found, with $G = G_C G_A G_P$, $$R = (1/(i + GH)) [G_A G_P (G_c + LAF)S + (1 - G_A G_P MAF)D]$$

and $$e_A = (1/(1 + GH))[\{(1 + GH)(G_c - N) - HG_A G_P (G_c + LAF)\}S - H(1 - G_A G_P MAF)D].$$

Let $L = (1 + GH - G)/G_A G_P$; $M = 1/(G_A G_P)$; and $N = G_C - H$, so that for $e_A = 0$, the $AF = 1$ and $R = S$, the loop command.

For the embodiment of FIG. 5, the bandwidth of the system is increased to the point (frequency) at which the compensation Blocks L, M, and N become either noise floor or amplitude limited.

The embodiments of FIG. 4 and FIG. 5 each provide a bandwidth extension of a closed loop control system. The embodiment of FIG. 4 is useful when D cannot be directly measured, in that the loop command S is employed to derive the reference and error signals for the AF. The embodiment of FIG. 5 is useful for the case where both D and S are measurable, and improves loop response with respect to D and also the overall operation of the control loop.

Figure 6:
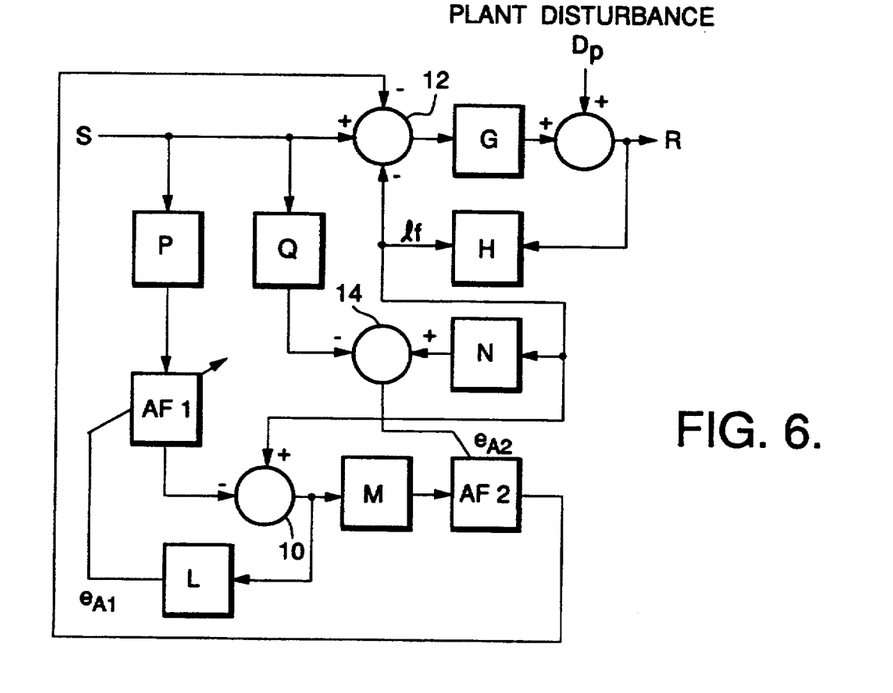
FIG. 6 is a block diagram illustrating ANC employing two adaptive filters that remove an unmeasurable disturbance to, or noise generated in, a forward path of the loop to improve the output response of the loop.
Figure 7:
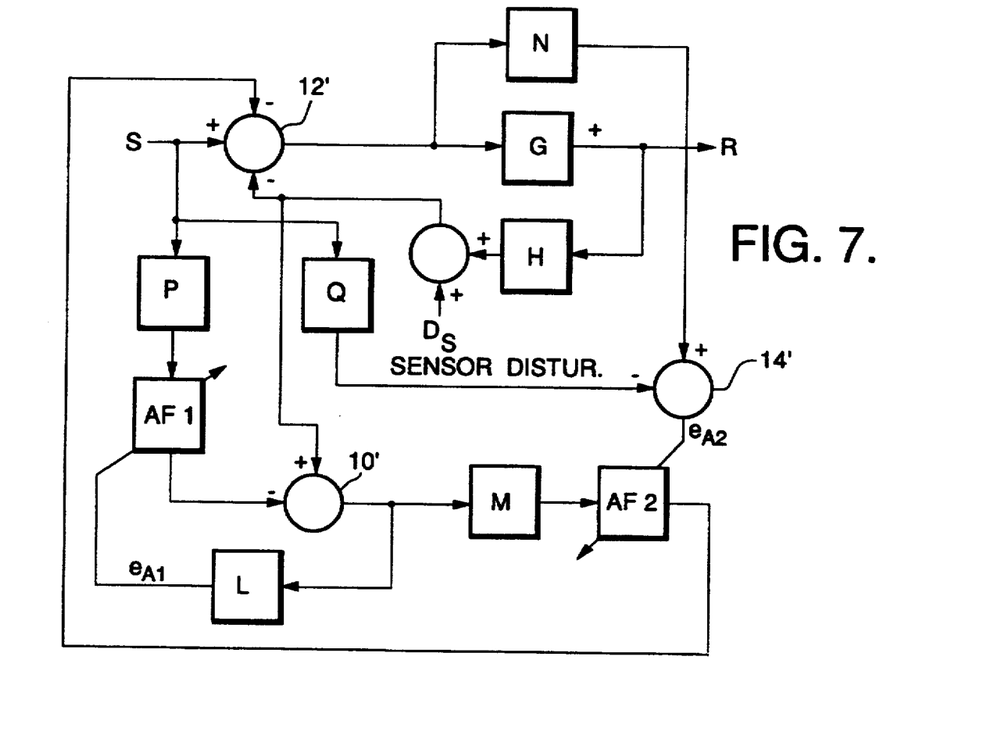
FIG. 7 is a block diagram illustrating ANC employing two adaptive filters that remove an unmeasurable disturbance to, or noise generated in, a feedback path of the loop to improve the output response of the loop.

Further in accordance with the invention, FIG. 6 is a block diagram illustrating ANC employing two adaptive filters (AF1 and AF2). AF1 and AF2 remove noise generated in a forward path of the loop to reduce the noise floor of the loop. FIG. 7 is a block diagram illustrating ANC employing two adaptive filters that remove noise generated in a feedback path of the loop. In both of these embodiments the two adaptive filters (AF1 and AF2) are employed to lower the intrinsic noise floor of the loop without requiring a direct measure of the noise or disturbance.

In FIGS. 6 and 7 AF1 estimates the component of the loop feedback signal related to the loop command "S", thereby removing said component from the loop feedback signal and leaving only the effects of D. The error signal for AF1 is thus representative of the noise floor of the loop. The output of AF1 is differenced at node 10 (10′) with the loop feedback signal (lf) output by Block H and the difference is provided as the reference for AF2. AF2 functions to remove the effect of D, or the noise floor, from the loop response R. In this regard the output of AF2 is provided to a node 12 (12′) where the AF2 output is subtracted from S, along with the loop feedback signal (lf). Closed loop ANC compensation is provided by Block L for AF1 and by Block N for AF2. Additional compensation is provided by blocks P and Q.

As can be seen, the source of the error feedback signal ($e_{A2}$) to AF2 is selected to reflect whether the noise is being generated in the forward path (FIG. 6) or in the feedback path (FIG. 7) of the loop. The error feedback signal ($e_{A2}$) to AF2 is also preferably modified as shown in FIGS. 6 and 7 to remove the effects of "S". This is accomplished by differencing at node 14 (14′) the output of block Q with the output of Block N. This difference becomes the error signal ($e_{A2}$) for AF2.

As was stated, FIG. 6 illustrates the forward path case while FIG. 7 illustrates the feedback path case. By example, in FIG. 6 the disturbance may associated with a plant dynamic, while in FIG. 7 the noise may be associated with the feedback sensor H.

The combined transfer functions for both of the embodiments shown in FIGS. 6 and 7 are as follows:

$$R = 1/(i+GH) \; [G(S-D_P)+D_S], \text{ for AF2}=0 \text{ ( turned off)},$$

$$e_{A1} = L/(i+GH)$$
$$[(GH-(i+GH)AF_1P)S+(HD_P+D_S)],$$

or $$e_{A1} = L/(i+GH) \; [HD_P+D_S]$$

when $AF1P = GH/(1+GH)$.

If it is assumed that $P = GH/(1+GH)$, then $AF1 = 1$. That is, the adaptive filter need only make up for the mismatch between P and the actual dynamics of the system. For well behaved, stationary systems AF1 may not be required.

It is further noted that letting $L = (1+GH)$ yields $$e_{A1} = HD_P + D_S.$$

That is, the error signal for AF1 becomes a direct measure of the plant and sensor disturbances for use as AF2's reference input.

Typically, AF1, if used, converges with AF2 turned off, and then AF1 is "frozen". AF2 is then turned on and converged to provide the noise floor suppression.

With (AF1)(P) as above and frozen there is obtained:

$$R = 1/(1+GH) + [GS + ((1+GH-GAF_2MH)D_P - G(1+GH+AF_2M)D_S)/(1+GH)],$$

and for $D_S = 0$, $D_P \neq 0$ $$e_{A2} = NH/(1+GH) \; [((NGH-Q(1+GH))/NH) S + ((1+GH-GAF_2MH)D_P)/(1+GH)].$$

Letting $e_{A2} = 0$ calls for $$Q = NGH/(1+GH),$$

$$M = (1+GH)/GH,$$

and $AF2 = 1$.

It is noted that Q is simplified and $e_{A2}$ is amplified if $N = 1 + GH$.

Similarly, for $D_S \neq 0$ and $D_P = 0$ $$e_{A2} = N/(1+GH)$$
$$[\{(1-Q(1+GH))/N\}S - (1/(1+GH))\{AF_2M + (1+GH)\}D_S].$$

For $e_{A2} = 0$ to be valid calls for $$Q = N/(1+GH),$$

$$M = 1 + GH,$$

and $AF2 = -1$.

$N = 1 + GH$ which provides simplicity for Q and an unattenuated and properly phased error signal ($e_{A2}$) at all frequencies of interest. $L = 1 + GH$ and provides the same function for AF1.

The analysis of $e_{A2}$ is given in two parts because the configurations shown in FIGS. 6 and 7 treat plant ($D_P$) and feedback disturbances ($D_S$) separately. Simultaneous reductions in the effects of both disturbances would require a third adaptive filter, since the adaptive filter requirement developed above (i.e., $AF_2 = 1$, $AF_2 = -1$) clearly cannot be satisfied by a single adaptive filter, unless $D_p$ and $D_s$ happen to be well separated spectrally.

A further aspect of the invention teaches an adaptive controller. In FIG. 8 there is illustrated an embodiment having an adaptive filter in series with a control dynamic (L). L is a best known approximation to the inverse of the plant dynamic $G_p$. That is, L is approximately $1/G_p$, and the AF operates to compensate for the residual. The filter N, in accordance with an aspect of the invention, stabilizes the AF for operation in the closed loop configuration.

The embodiment of FIG. 8 is similar in some respects to conventional adaptive inverse control with one important distinction: the disturbance measure D, introduced at node 16 downstream of L, AF, and the plant dynamic $G_P$ causes the AF to converge to a form such that it minimizes the effect of D on R, while simultaneously causing the overall system to perform as a unity gain control system with-respect to S, the loop command.

In accordance with FIG. 8 there is obtained:

$$R = ((LAF + G_C)G_P S + (1 - ML_{AF}G_P)D)/(1 + G_C G_P) \text{ and}$$
$$e_A = M[(1 + G_C G_P - (LAF + G_C)G_P)S - (1 - ML_{AF}G_P)D]/(1 + G_C G_P).$$

It is observed that for $R = S$ and $e_A = 0$ to occur requires that $$L = 1/G_P, M = 1 \text{ and } AF = 1.$$

In practice the AF converges so as to minimize the difference between the filter L and the inverse of the plant dynamic, $1/G_P$.

In summary, it is noted that $AF = 1$ is realized only in an ideal case, and that in practice AF becomes the difference between the assumed compensation and the actual system compensation. The compensating filter M filters out the sensor dynamic, and N is required to maintain stability in the closed loop configuration. That is, N is selected to increase the magnitude of the error signal input to the AF and to compensate the error signal's phase.

It should be realized that applications of the teaching of the invention include, but are not limited to, base motion rejection for beam control systems, the stabilization of acquisition, pointing, and tracking systems, mechanical resonance control (at or near cross over), adaptive suspension control systems and systems having multiple inputs/outputs/disturbances and noises. Furthermore, the various blocks depicted in the drawings may be implemented with analog components, with instructions executed by a data processor such as a Digital Signal Processor (DSP), or may be implemented by a combination of these techniques.

Thus, while the invention has been particularly shown and described with respect to preferred embodiments thereof, it will be understood by those skilled in the art that changes in form and details may be made therein without departing from the scope and spirit of the invention.

What is claimed is:

1. A closed loop control system adapted to receive a loop command signal (s) and to output a result signal (r), said system comprising:

first difference means for generating a loop error signal indicating a difference between the loop command signal (s) and the result signal (r);

second difference means for generating another error signal indicating a difference between the loop command signal (s) and a measure of a loop disturbance (d);

a system dynamic ($G_c$) responsive to said loop error signal;

means for emulating an operation of an ideal closed loop control system, said emulating means being responsive to said loop error signal and said another error signal, said emulating means generating an adaptive compensating signal summing means for summing said adaptive compensating signal with an output of said system dynamic ($G_c$); and a system actuator ($G_a$) or a system plant dynamic ($G_p$), responsive to an output of said summing means, wherein said emulating means includes adaptive compensation means for furnishing the adaptive compensating signal;

a first compensating means, responsive to an output of said second difference means, having a transfer function that approximates an inverse of the system plant dynamic ($G_p$), a second compensating means, responsive to an output of said first difference means, having a transfer function selected to stabilize the adaptive compensation means for operation in the closed loop control system, said adaptive compensation means being responsive to outputs from said first and second compensating means.

2. A closed loop control system as set forth in claim 1 wherein said emulating means operates to cause the closed loop control system to operate with a unity gain with respect to the loop command signal (s).

3. A closed loop control system as set forth in claim 1 wherein said second difference means and said emulating means operate to substantially cancel the loop disturbance signal (d) from the result signal (r).

4. A closed loop control system having at least one system dynamic and a reduced intrinsic noise floor, the closed loop control system being adapted to receive a loop command signal (s) and to output a result signal (r), said system comprising measuring means (H), responsive to said result signal (r), a loop feedback signal (lf), said loop feedback signal (lf) including a measure of said result signal and a disturbance signal component (d), said component (d) resulting from a disturbance in a forward path of the closed loop control system; and compensation means, responsive to the loop feedback signal (lf), for generating a compensating signal that modifies an input to at least one of the system dynamics to remove the disturbance signal component (d) from the closed loop control system without requiring a direct measure of the disturbance signal component (d), wherein said compensation means includes: first adaptive filer means responsive to the loop command signal (s) and an output of first determining means for generating a first error signal indicating a difference between the loop feedback signal and an output of the first adaptive filter means, said first adaptive filter means operating to remove the loop command signal (s) such that the output of the measuring means and the first determining means both provides a signal that indicates only the disturbance signal component (d);

a compensation block L for modifying said first error signal supplied to said first adaptive filter means, said compensation block L having a transfer function selected to stabilize said first adaptive filter means for operation in the closed loop control system;

second determining means for determining a difference between said loop command signal (s) and said loop feedback signal (lf), said second determining means having an output providing a second error signal that is expressive of the loop output signal (r) and the loop disturbance signal component (d);

second adaptive filter means, responsive to said first and second error signals;

a compensation block N for modifying said second error signal supplied to said second determining means, said block N having a transfer function selected to stabilize said second adaptive filter means for operation in the closed loop control system; and subtracting means for subtracting the loop feedback signal (lf) and an output of said second adaptive filter means from said loop command signal (s), said subtracting means having an output coupled to said input of said at least one system dynamic.

5. A closed loop control system as set forth in claim 4 wherein said loop command signal (s) supplied to said first adaptive filter means is modified by a compensating means (P) having a transfer function that approximates the closed loop transfer function of the control loop multiplied by the transfer function of the measuring means (H).

6. A closed loop control system as set forth in claim 4 wherein said loop command signal (s) supplied to said second determining means is modified by a compensating means (Q) having a transfer function for minimizing a component of the loop command signal (s) at the output of the second determining means.

7. A closed loop control system having at least one system dynamic and a reduced intrinsic noise floor, the closed loop control system being adapted to receive a loop command signal (s) and to output a result signal (r), said system comprising measuring means (H), responsive to said result signal (r), a loop feedback signal (lf), said loop feedback signal (lf) including a measure of said result signal and a disturbance signal component (d), said component (d) resulting from disturbance in a feedback path of said closed loop control system; and compensation means, responsive to the loop feedback signal (lf), for generating a compensating signal that modifies an input to at least one of the system dynamics to remove the disturbance signal component (d) from the closed loop control system without requiring a direct measure of the disturbance signal component (d), wherein said compensation means includes:

first adaptive filter means responsive to the loop command signal (s) and a first error signal generated by first determining means, said first adaptive filter means operating to remove the loop command signal (s) to provide a signal that is expressive only of the disturbance signal component (d);

said first determining means determining a difference between an output of said first adaptive filter means and said loop feedback signal (lf), said first determining means providing said first error signal indicating the disturbance signal component (d);

a compensation block L for modifying said first error signal to said first adaptive filter means, said compensation block L having a transfer function selected to stabilize said first adaptive filter means for operation in the closed loop control system;

second determining means for determining a difference between said loop command signal (s) and an output of subtracting means, said second determining means providing a second error signal indicating the loop error signal plus the associated loop disturbance signal component (d);

second adaptive filter means responsive to said first second error signals; a compensation block for modifying said output of said subtracting means to said second determining means, said compensation block N having a transfer function selected to stabilize said second adaptive filter means for operation in the closed loop control system; and said subtracting means for subtracting the loop feedback signal (lf) and an output of said second adaptive filter means from said loop command signal (s), said subtracting means having an output coupled to said input of said at least one system dynamic.

8. A closed loop control system as set forth in claim 7 wherein said first error signal supplied to said first adaptive filter means is modified by a compensating means (P) having a transfer function that approximates the closed loop transfer function of the control loop multiplied by the transfer function of the measuring means (H).

9. A closed loop control system as set forth in claim 7 wherein said output from said subtracting means to said second determining means is modified by a compensating means (Q) having a transfer function for minimizing a component of the loop command signal (s) at the output of the second determining means.

10. A closed loop control system adapted to receive a loop command signal (s) and to output a result signal (r), said system comprising:

first difference means for generating a loop error signal indicating a difference between the loop command signal (s) and the result signal (r), the result signal (r) including a disturbance signal component (d);

a system dynamic ($G_c$) responsive to the loop error signal;

first compensating means (L) for providing a compensated measure of the loop command signal (s);

second compensating means (N) for providing a compensated measure of the loop command signal (s);

second difference means for generating a signal indicating a difference between outputs of said system dynamic ($G_c$) and said second compensating means;

adaptive compensation means (AF) responsive to an output of said first compensating means (L) and an output of said second difference means;

summing means for summing an output of said system dynamic ($G_c$) and an output of said adaptive compensation means; and a system plant dynamic ($G_p$) responsive to an output of said summing means;

wherein the transfer function of said first compensating means L is selected to cause the closed loop control system to operate with a unity gain with respect to the loop command signal (s); and wherein the transfer function of said second compensating means N is selected so as to stabilize the operation of the adaptive compensation means for operation in the closed loop control system.

11. A closed loop control system as set forth in claim 10 and further comprising:

means (M) for providing a measure of the disturbance (d); and third difference means for determining a difference between said output of said first compensating means (L) and said output of said providing means (M), said reference input of said adaptive compensation means being responsive to an output of said third difference means and an output of said second difference means.

* * * * *